(12) United States Patent
Shimizu et al.

(10) Patent No.: US 10,970,483 B2
(45) Date of Patent: Apr. 6, 2021

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventors: Junichi Shimizu, Kanagawa (JP); Kunihiko Kobayashi, Kanagawa (JP); Daigo Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/529,780

(22) Filed: Aug. 1, 2019

(65) Prior Publication Data

US 2020/0250266 A1 Aug. 6, 2020

(30) Foreign Application Priority Data

Feb. 5, 2019 (JP) .............................. JP2019-019089

(51) Int. Cl.
*G06F 17/00* (2019.01)
*G06F 40/268* (2020.01)
*G06K 9/00* (2006.01)

(52) U.S. Cl.
CPC ....... *G06F 40/268* (2020.01); *G06K 9/00442* (2013.01); *G06K 2209/01* (2013.01)

(58) Field of Classification Search
CPC .............. G06F 40/268; G06K 9/00442; G06K 2209/01; G06K 9/00469; G06K 9/00463; G06K 9/6253; G06K 9/6262
See application file for complete search history.

(56) References Cited

U.S. PATENT DOCUMENTS

| | | | |
|---|---|---|---|
| 8,139,870 B2* | 3/2012 | Kato | G06K 9/72 382/229 |
| 2013/0054644 A1* | 2/2013 | Nakano | G06F 40/10 707/774 |
| 2014/0093172 A1* | 4/2014 | Tonogai | G06K 9/723 382/182 |
| 2018/0276493 A1* | 9/2018 | Wang | G06K 9/348 |
| 2018/0336643 A1* | 11/2018 | Li | G06Q 40/12 |
| 2018/0350144 A1* | 12/2018 | Rathod | G06Q 20/3276 |
| 2019/0050639 A1* | 2/2019 | Ast | G06K 9/6267 |
| 2019/0122181 A1* | 4/2019 | Maeda | G06Q 10/1095 |
| 2019/0197303 A1* | 6/2019 | Kanada | H04N 1/32101 |
| 2019/0303701 A1* | 10/2019 | Kazume | G06F 16/164 |
| 2019/0333175 A1* | 10/2019 | Rose | G06N 3/0445 |

FOREIGN PATENT DOCUMENTS

| | | |
|---|---|---|
| JP | H08-069451 | 3/1996 |
| JP | 2002-197105 | 7/2002 |
| JP | 2004-185452 | 7/2004 |

* cited by examiner

*Primary Examiner* — Laurie A Ries
(74) *Attorney, Agent, or Firm* — JCIPRNET

(57) ABSTRACT

An information processing apparatus includes a first extraction part that extracts a value corresponding to a first item, which is an item indicative of a deadline, from a result of character recognition with respect to an image acquired by reading a document which includes an item and a value corresponding to the item; a generation part that generates a second character string of a date format indicative of a date of the deadline based on the result of the character recognition in a case where the value extracted by the first extraction part is a first character string other than the date format; and an output part that outputs the generated second character string as the value corresponding to the first item.

20 Claims, 13 Drawing Sheets

FIG. 1

KEY   : DAY OF ISSUE
VALUE : JANUARY 7 2019

KEY   : ESTIMATION EXPIRATION DATE
VALUE : ONE MONTH AFTER ESTIMATION DAY

MANAGEMENT NUMBER : #12345
DAY OF ISSUE      : JANUARY 7 2019

MESSRS. OO CORPORATION

△△ CORPORATION
PERSON IN CHARGE: FUJI TARO

ESTIMATION SHEET

RELATES TO MATTERS OF REQUEST, WE WILL MAKE ESTIMATE AS FOLLOWS.

AMOUNT OF ESTIMATION MONEY : 15,000 YEN
PAYMENT TIME LIMIT         : MARCH 31 2019
ESTIMATION EXPIRATION DATE : ONE MONTH AFTER ESTIMATION DAY

|   | ITEM NAME    | UNIT PRICE | QUANTITY | AMOUNT OF MONEY |
|---|--------------|------------|----------|-----------------|
| 1 | A            | 10,000     | 1        | 10,000          |
| 2 | B            | 5,000      | 1        | 5,000           |
|   | TOTAL AMOUNT |            |          | 15,000          |

FIG. 2

SETTING SCREEN

TYPE OF DOCUMENT
- ESTIMATION SHEET
- INVOICE
- REQUEST FORM

ITEM
- ESTIMATION EXPIRATION DATE
- DAY OF ISSUE

[END] [START]

FIG. 3

RESULT OF EXTRACTION

DAY OF ISSUE: JANUARY 7 2019

ESTIMATION EXPIRATION DATE:
- ONE MONTH AFTER ESTIMATION DAY
- FEBRUARY 7 2019

[END] [DECIDE]

FIG. 4

- DATE FORMAT
  - 2018/10/30
  - OCTOBER 30 OF HEISEI 30
  - 2018-10-30
  - 2018. 10. 30
  - Oct 30, 2018
  - OCTOBER 30 OF H30
  - OCTOBER 30, 2018

FIG. 5

- OTHER THAN DATE FORMAT
  - THREE MONTHS
  - 30 DAYS
  - ONE MONTH
  - ONE MONTH AFTER TODAY
  - ONE MONTH AFTER ESTIMATION DAY
  - ONE MONTH AFTER DAY OF ISSUE
  - WITHIN ONE MONTH AFTER DAY OF ISSUE
  - ONE MONTH AFTER DAY OF ESTIMATION
  - 30 DAYS AFTER DAY OF ISSUE OF THIS BOOK
  - THREE MONTHS AFTER ESTIMATION PREPARATION DAY
  - 30 DAYS AFTER DAY OF ISSUE OF THIS ESTIMATION SHEET
  - UP TO NOVEMBER 30 FROM NOVEMBER 8, 2013
  - UP TO NOVEMBER 30
  - 30 DAYS AFTER ISSUE
  - THREE MONTHS AFTER ISSUE
  - TWO WEEKS AFTER ESTIMATION
  - ONE MONTH AFTER THIS ESTIMATION SUBMISSION
  - JULY 31, 2013

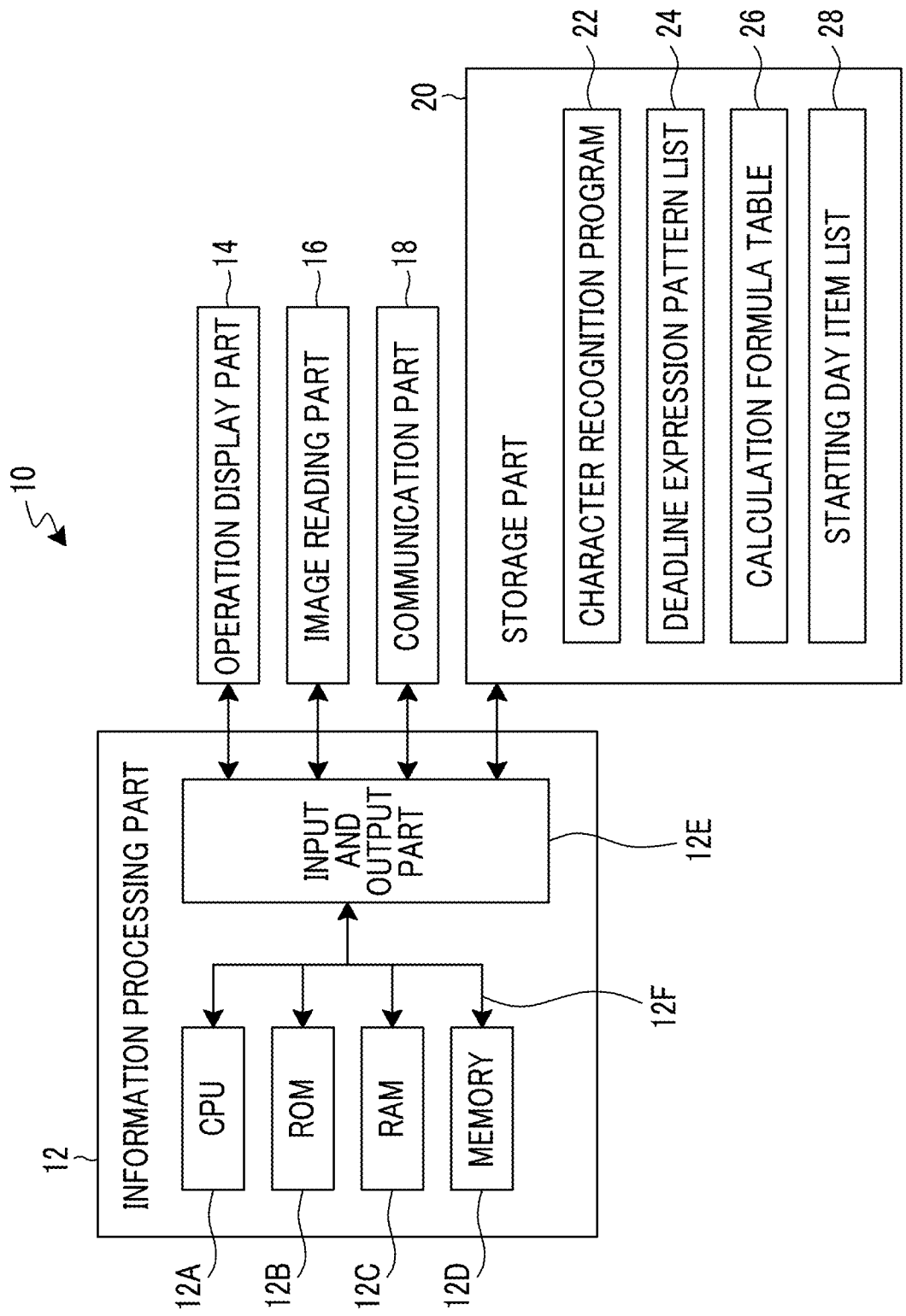

FIG. 7

| DEADLINE EXPRESSION PATTERN | CALCULATION FORMULA |
|---|---|
| N MONTHS | $STARTING DAY$ + N × 30 ± CORRECTION OF FOR EACH MONTH |
| N MONTHS AFTER ESTIMATION DAY | $STARTING DAY$ + N × 30 ± CORRECTION OF FOR EACH MONTH |
| N WEEKS AFTER ESTIMATION | $STARTING DAY$ + N × 7 |
| ...... | ...... |

| TYPE OF DOCUMENT | ITEM INDICATIVE OF STARTING DAY |
|---|---|
| ESTIMATION SHEET | DAY OF ISSUE, PREPARATION DAY, ESTIMATION DAY |
| INVOICE | DAY OF ISSUE, PREPARATION DAY, BILLING DATE |
| ... | ... |

<DAY NUMBER CONVERSION RULE>

NUMBER OF DAYS INDICATED BY NUMERAL CLASSIFIER
  "MONTH" → 28 or 29 or 30 or 31
  "WEEK" → 7
  "DAY" → 1

NUMBER OF DAYS OF PERIOD = NUMERAL × NUMBER OF DAYS IN UNITS INDICATED BY NUMERAL CLASSIFIER

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-019089 filed Feb. 5, 2019.

BACKGROUND

(i) Technical Field

The present invention relates to an information processing apparatus and a non-transitory computer readable medium storing a program.

(ii) Related Art

JP1996-069451A discloses a document preparing apparatus, which is capable of preparing document information having information such as a date, the document preparing apparatus including: a date information storage unit that stores date information and date expression format information; an extraction unit that extracts information, which matches the expression format information stored in the date information storage unit, from the prepared document information; a unit that cuts information relevant to the date from the information extracted by the extraction unit, and compares the information relevant to the date with the date information of the date information storage unit; and a unit that, in a case where the information cut by the unit does not match the date information, displays and outputs a relevant mismatching spot.

JP2002-197105A discloses an information search apparatus including an input unit that inputs various data; a registration unit that gives search information with respect to each of the data and registers the search information; a storage unit that stores a group of the registered information; a display unit that displays and outputs the various data; an input day search key setting unit that sets a date, on which the data is input, as an input day search key; a search unit that searches the group of the information based on the input day search key; and a conversion unit that, in a case where a character string relevant to the date, is input, converts the character string into date information, thereby searching for a data input day based on the character string relevant to the date.

JP2004-185452A discloses a document management system, which is a system for managing a document, the document management system including: a cutting process part that cuts a character string, which is an index with respect to an input document, together with a search class based on cutting rule data; a plurality of shaping process parts that maintain individual rules for converting the character string into a regular expression, and that convert the character string according to the respective rules; and a shaping process control part that instructs to replace the character string, which is cut together with the search class by the cutting process part, with the regular expression by calling the relevant shaping processing unit according to the relevant shaping rule data, and that outputs a result as a shaped document.

SUMMARY

There is a document, such as a business report, which includes an item and a value relevant to the item. Furthermore, there is a case where a value other than a date is associated with respect to an item, such as a delivery time limit, which requires the date as the value. In a case where a human reads the document, there are many cases where the date is estimated from the value other than the date. However, in character recognition with respect to an image acquired by reading the document, date conversion is not performed.

Aspects of non-limiting embodiments of the present disclosure relate to an information processing apparatus and a non-transitory computer readable medium storing a program, which is capable of outputting a character string of a date format indicative of a date of a deadline in a case where a character string other than the date format is extracted as a value with respect to an item indicative of the deadline from a result of the character recognition with respect to the image acquired by reading the document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a first extraction part that extracts a value corresponding to a first item, which is an item indicative of a deadline, from a result of character recognition with respect to an image acquired by reading a document which includes an item and a value corresponding to the item; a generation part that generates a second character string of a date format indicative of a date of the deadline based on the result of the character recognition in a case where the value extracted by the first extraction part is a first character string other than the date format; and an output part that outputs the generated second character string as the value corresponding to the first item.

BRIEF DESCRIPTION OF THE DRAWINGS

Exemplary embodiment(s) of the present invention will be described in detail based on the following figures, wherein:

FIG. 1 is an outline diagram illustrating an example of a document which is a target of character recognition;

FIG. 2 is a schematic diagram illustrating an example of a screen which is displayed to a user;

FIG. 3 is a schematic diagram illustrating another example of the screen which is displayed to the user;

FIG. 4 is a diagram illustrating expression patterns of a date format of a deadline;

FIG. 5 is a diagram illustrating expression patterns other than the date format of the deadline;

FIG. 6 is a block diagram illustrating an electrical configuration of an information processing apparatus according to a first exemplary embodiment;

FIG. 7 is a chart illustrating a calculation formula table;

FIG. 8 is a chart illustrating a starting day item list;

DETAILED DESCRIPTION

Figure 9:
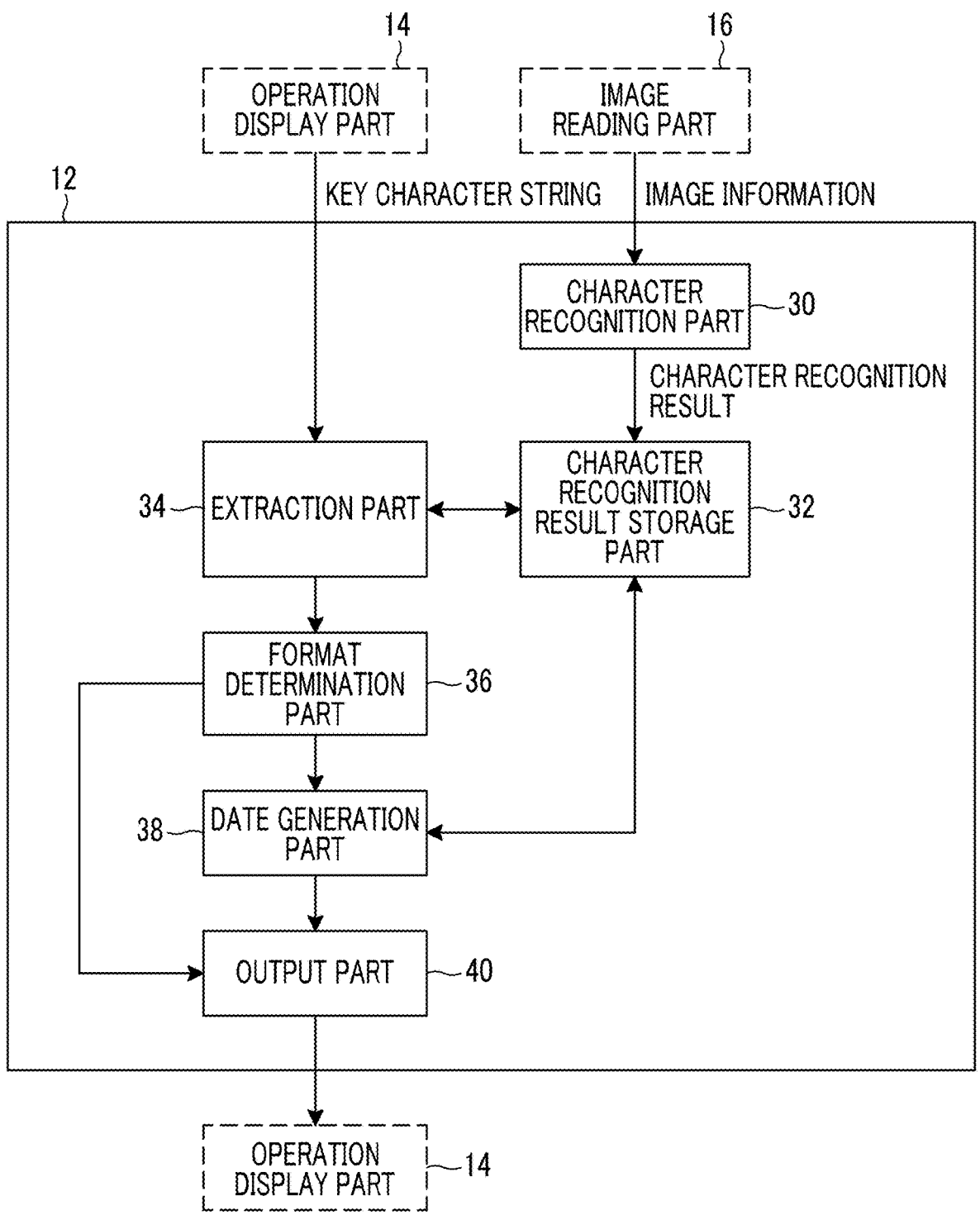
FIG. 9 is a functional block diagram illustrating a functional configuration of an information processing part according to the first exemplary embodiment.

Hereinafter, an example of an exemplary embodiment of the present invention will be described with reference to the accompanying drawings.

First Exemplary Embodiment

Document to be Target of Character Recognition

First, a document to be a target of character recognition in the exemplary embodiment will be described. FIG. 1 is an outline diagram illustrating an example of the document to be the target of the character recognition. The document to be the target of the character recognition is a document which includes an item and a value corresponding to the item. For example, in a business report, such as an estimation sheet, a relevant value is described for each item. Hereinafter, a case where the document is the estimation sheet will be described.

As illustrated in FIG. 1, the estimation sheet includes, as items, management number, day of issue, amount of estimation money, payment time limit, estimation expiration date, item name, unit price, quantity, the amount of money, and the like. For example, with respect to an item "day of issue", a value "Jan. 7, 2019" is described. In addition, with respect to an item "estimation expiration date", a value "one month after estimation day" is described.

An image of the estimation sheet is read using the estimation sheet as the document. In a page of the read image, an image indicative of a value corresponding to an item is disposed in a vicinity of the image indicative of the item. In a case where the character recognition is performed with respect to the read image, the character recognition is performed for each image in the page. A result of the character recognition includes a location of the image indicative of the item in the page, a character string indicative of the item, a location of the image indicative of the value in the page, and a character string indicative of the value. The location in the page may be indicated using locational coordinates in which a predetermined point is an origin.

Item and Value

The character string indicative of the item is associated with the character string indicative of the value corresponding to the item by the location in each page. The character string indicative of the item is designated, and a character string indicative of a relevant value is extracted from the result of the character recognition. Hereinafter, the character string indicative of the item is referred to as a "key character string" and the character string indicative of the value is referred to as a "value character string". In addition, a process of designating the key character string and extracting the value character string is referred to as "key value extraction".

FIG. 2 is a schematic diagram illustrating an example of a screen which is displayed to the user. The screen illustrated in FIG. 2 is a setting screen for setting a condition of the character recognition. The user operates the setting screen, and selects the item and a type of the document. For example, in the example illustrated in the drawing, "estimation sheet" is designated as the type of the document. In addition, an item of estimation expiration date is selected, and a character string "estimation expiration date" is designated as the key character string. In a case where a start button is pressed to instruct to start a character recognition process, a read image character recognition process starts. Furthermore, the key value extraction is performed with respect to the result of the character recognition, and the value character string is extracted.

Character String of Date Format

An item indicative of a "deadline", such as the day of issue or the estimation expiration date, is an item of requesting a character string of a date format indicative of a date of the deadline as the relevant value. In a case where the key value extraction is performed using the "estimation expiration date" as the key character string, it is assumed that a value character string of the date format is extracted.

However, there is a case where, a character string other than the date format is associated, as the value, with the item indicative of the deadline. For example, in the example illustrated in FIG. 1, with respect to the key character string "estimation expiration date", a character string "one month after estimation day" is extracted as the value character string. The character string other than the date format does not directly indicate the date of the deadline.

FIG. 4 is a diagram illustrating expression patterns of a date format of the deadline. As illustrated in FIG. 4, the expression patterns of the date format include 2018/10/30, October 30 of Heisei 30, 2018-10-30, 2018.10.30, Oct 30, 2018, October 30 of H30, October 30, 2018, and the like.

In a case where a date is indicated in the Christian era, the character string of the date format is a character string in which a 4-digit number indicative of "year", a character of the "year", a 1-digit or 2-digit number indicative of "month", a character of the "month", a 1-digit or 2-digit number indicative of "day", and a character of the "day" are arranged in order of year→month→day. The characters of the year, month, and day may be replaced with symbols such as a slash, a hyphen, and a dot. According to a language, the order of description of the year, month, and day may be shifted, and the characters of the year, month, and day may be replaced with alphabets.

In a case where the date is indicated in Japanese era name, the character string of the date format is a character string in which a character indicative of an era name, a 1-digit or 2-digit number indicative of "year", the character of the "year", a 1-digit or 2-digit number indicative of "month", a character of the "month", a 1-digit or 2-digit number indicative of "day", and a character of the "day" are arranged in order of year→month→day. The character indicative of the era name may be replaced with a first character of the alphabets.

In the exemplary embodiment, a character string having a pattern of a predetermined date format, such as a character string which includes a number indicative of the "year, a number indicative of the "month", and a number indicative of the "day", may be set as "the character string of the date format".

The character string other than the date format is a character string other than "the character string of the date format". FIG. 5 is a diagram illustrating expression patterns other than the date format of the deadline. As illustrated in FIG. 5, the expression patterns other than the date format of the deadline include three months, 30 days, one month, one month after today, one month after estimation day, one month after day of issue, within one month after day of issue, one month after day of estimation, 30 days after day of issue of this book, three months after estimation preparation day, 30 days after day of issue of this estimation sheet, up to November 30 from Nov. 8, 2013, up to November 30, 30 days after issue, three months after issue, two weeks after estimation, one month after this estimation submission, Jul. 31, 2013, and the like.

As illustrated in FIG. 5, the character string other than the date format is, for example, a character string which does not include the number indicative of the "year", the number indicative of the "month", and the number indicative of the "day", and a character string which includes an extra character after the character string of the date format. The extra character includes, for example, a postpositional particle, a case particle (from ~), a suffix (up to), and the like.

Generation of Character String of Date Format

In the exemplary embodiment, in a case where the character string other than the date format is associated, as the value, with the item indicative of the deadline, the character string of the date format indicative of the date of the deadline is generated using the result of the character recognition. The date of the deadline is calculated based on the date of the starting day. For example, in a case where it is possible to acquire the date of the starting day from the result of the character recognition, the date of the deadline is acquired from the date of the starting day, and the character string of the date format indicative of the date of the deadline is generated. Furthermore, the generated character string of the date format is displayed to the user.

FIG. 3 is a schematic diagram illustrating an example of the screen which is displayed to the user. The screen illustrated in FIG. 3 displays a result of the key value extraction in which the "estimation expiration date" is used as the key character string. In the illustrated example, the character string other than the date format "one month after estimation day" is extracted as the value character string.

In the exemplary embodiment, the generated character string of the date format is displayed to the user, together with the extracted value character string or instead of the extracted value character string. For example, both the extracted value character string and the generated character string of the date format may be displayed as options to cause the user to perform selection. In addition, the result of the character recognition may be corrected by replacing the character string other than the date format with the generated character string of the date format.

Information Processing Apparatus

Subsequently, a hardware configuration of an information processing apparatus will be described.

FIG. 6 is a block diagram illustrating an electrical configuration of the information processing apparatus according to a first exemplary embodiment. As illustrated in FIG. 6, the information processing apparatus 10 includes an information processing part 12 which is a computer that controls respective connected parts and performs various operations. That is, the information processing part 12 includes a Central Processing Unit (CPU) 12A, a Read Only Memory (ROM) 12B, a Random Access Memory (RAM) 12C, a non-volatile memory 12D, and an input and output part (I/O) 12E.

Each of the CPU 12A, the ROM 12B, the RAM 12C, the memory 12D, and the I/O 12E is connected through a bus 12F. The CPU 12A reads a program stored in a storage apparatus, such as the ROM 12B, and executes the program using the RAM 12C as a work area.

The information processing apparatus 10 includes, for example, an operation display part 14, an image reading part 16, a communication part 18, and a storage part 20. Each of the operation display part 14, the image reading part 16, the communication part 18, and the storage part 20 is connected to the I/O 12E of the information processing part 12.

The operation display part 14 displays various screens to the user and receives operations from the user. The operation display part 14 includes, for example, a touch panel or the like. The image reading part 16 is an apparatus which reads an image of a set document. The communication part 18 is an interface for performing communication with an external apparatus through a wired or wireless communication line. The storage part 20 is an external storage apparatus such as a hard disk.

Various programs and various data are stored in the storage apparatus such as the ROM 12B. A program storage area is not limited to the ROM 12B. The various programs may be stored in another storage apparatus, such as the memory 12D or the storage part 20, or may be acquired from the external apparatus through the communication part 18.

In addition, various drives may be connected to the information processing part 12. The various drives are apparatuses which read data from a portable computer-readable recording medium, such as a CD-ROM or a Universal Serial Bus (USB) memory, or which write the data with respect to the recording medium. In a case where the various drives are included, the program may be recorded in the portable recording medium and may be read and executed by a relevant drive.

In the exemplary embodiment, a character recognition program 22, a deadline expression pattern list 24, a calculation formula table 26, and a starting day item list 28, which will be described later, are respectively stored in the storage part 20. The various programs and the various data may be stored in another storage apparatus or an external storage apparatus.

The deadline expression pattern list 24 is a list of the expression patterns other than the date format of the deadline (refer to FIG. 5). The expression patterns may be described using a regular expression. As illustrated in FIG. 7, the calculation formula table 26 maintains predetermined relationships between the expression patterns other than the date format of the deadline and calculation formulas in a table format. As illustrated in FIG. 8, the starting day item list 28 is a list of an item indicative of the starting day. The item indicative of the starting day is preset according to the type of the document. A plurality of items indicative of the starting day may be set with respect to one type of document.

Process of Generating Character String of Date Format

Subsequently, a process of generating the character string of the date format will be simply described.

In a case where a value character string other than the date format is associated with a key character string indicative of the deadline, first, an expression pattern of the value character string other than the date format is specified. Subsequently, a calculation formula corresponding to the specified expression pattern is determined.

The value character string other than the date format is compared with each of the plurality of expression patterns in the deadline expression pattern list 24 through pattern matching. In a case where a matching expression pattern exists, a calculation formula corresponding to the matching expression pattern is determined to be a calculation formula to be used based on the calculation formula table 26 illustrated in FIG. 7. For example, in a case of an expression pattern "N months after estimation day", the following Equation (1) is set as the calculation formula.

$$\text{deadline} = \$\text{starting day}\$ + (N \times 30 \pm \text{correction of for each month}) \quad \text{Equation (1)}$$

Equation (1) is for determining a deadline calculation rule in which the number of days according to "N months" is added to the date of the starting day. In Equation (1), one month is set to 30 days. The number of days of one month differs according to the month in a range of 28 days to 31 days, and thus the number of days of one month is corrected for each month.

Subsequently, the item indicative of the starting day is determined. The item indicative of the starting day is acquired from the starting day item list 28 illustrated in FIG. 8 according to the designated type of the document. For example, in a case where the type of the document is the estimation sheet, the day of issue, the preparation day, the estimation day are included in the item indicative of the starting day. Although words of the day of issue, the preparation day, and the estimation day are respectively different from each other, all of the day of issue, the preparation day, and the estimation day indicate the same day.

Subsequently, the date of the starting day is determined. The item indicative of the starting day is set as the key character string, and the key value extraction is performed. In a case where the value character string of the date format is extracted, a date indicated by the extracted value character string is acquired as the date of the starting day.

For example, the day of issue is set as the key character string, and the key value extraction is performed. In a case where the value character string of the date format is not extracted, the preparation day is subsequently set as the key character string, and the key value extraction is performed. In the case where the value character string of the date format is not extracted, the estimation day is subsequently set as the key character string, and the key value extraction is performed. The order of the item indicative of the starting day may be shifted. In a case where the value character string of the date format is extracted, the date of the starting day is determined.

Subsequently, the date of the deadline is calculated from the date of the starting day using the determined calculation formula. For example, in a case where Equation (1) is determined to be the calculation formula, the starting day is determined to be the day of issue, and a date of the day of issue is determined to be Jan. 7, 2019, the date of the deadline Feb. 7, 2019 is calculated. At last, a character string "Jan. 7, 2019", which indicates the date of the deadline using the date format, is generated.

Functional Configuration

Subsequently, a functional configuration of the information processing apparatus will be described.

FIG. 9 is a functional block diagram illustrating the functional configuration of the information processing part according to the first exemplary embodiment. As illustrated in FIG. 9, the information processing part 12 includes a character recognition part 30, a character recognition result storage part 32, an extraction part 34, a format determination part 36, a date generation part 38, and an output part 40.

In the exemplary embodiment, the setting screen illustrated in FIG. 2 is displayed on the operation display part 14 illustrated in FIG. 6. The setting screen is operated by the user, the item indicative of the deadline and the type of the document are designated, and thus it is instructed to perform the character recognition. For example, the "estimation expiration date" is designated as the key character string with respect to the estimation sheet. In addition, the image of the estimation sheet is read by the image reading part 16 illustrated in FIG. 6.

The character recognition part 30 acquires image information from the image reading part 16, and performs the character recognition with respect to the read image. The result of the character recognition is stored in the character recognition result storage part 32.

The extraction part 34 acquires the designated key character string from the operation display part 14. The extraction part 34 performs the key value extraction with respect to the designated key character string based on the result of the character recognition, and acquires the value character string corresponding to the key character string.

The format determination part 36 determines whether or not the value character string extracted by the extraction part 34 is the character string of the date format. In a case where the character string other than the date format is extracted by the extraction part 34, the extracted value character string is transported to the date generation part 38. In a case where the character string of the date format is extracted by the extraction part 34, the extracted value character string is transported to the output part 40.

The date generation part 38 generates the character string of the date format indicative of the date of the deadline based on the value character string, which is extracted by the extraction part 34, using the result of the character recognition. The date generation part 38 transports the generated character string of the date format to the output part 40. In a case where it is not possible for the date generation part 38 to generate the character string of the date format, the date generation part 38 transports the value character string extracted by the extraction part 34 to the output part 40.

The output part 40 displays at least one of the value character string extracted by the extraction part 34 or the character string generated by the date generation part 38, as a result of the extraction, on the operation display part 14. For example, the output part 40 generates screen information for displaying the result of the extraction, and outputs the screen information to the operation display part 14. The operation display part 14 displays the screen based on the screen information.

Program

Subsequently, a character recognition program will be described.

Figure 10:
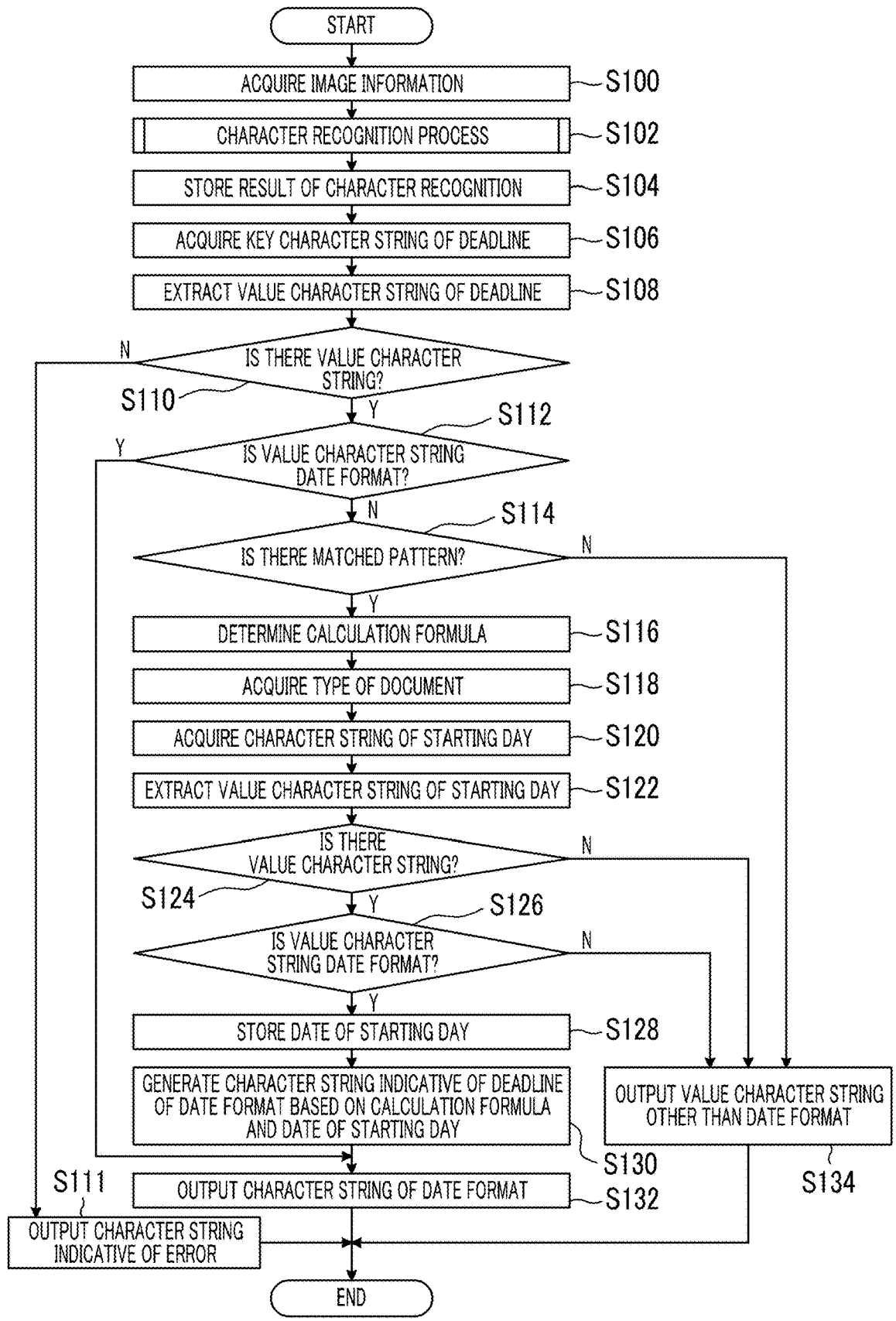
FIG. 10 is a flowchart illustrating a flow of a process by a character recognition program according to the first exemplary embodiment.

FIG. 10 is a flowchart illustrating a flow of a process by the character recognition program according to the first exemplary embodiment. The character recognition program is read from the storage part 20 and is executed by the CPU 12A of the information processing apparatus 10. In a case where it is instructed to start the character recognition process by the user, the character recognition program is executed.

First, in step S100, the image information of the read image of the estimation sheet is acquired from the image reading part 16. Subsequently, in step S102, the character recognition process is performed with respect to the read image of the estimation sheet. Subsequently, in step S104, a result of the character recognition is stored. Subsequently, in step S106, a character string of the item indicative of the deadline (for example, "estimation expiration date") designated by the user is acquired as the key character string.

Subsequently, in step S108, the key value extraction based on the result of the character recognition is performed using the character string of the item indicative of the deadline as the key character string, and the value character string corresponding to the key character string is extracted. Hereinafter, the character string of the item indicative of the deadline is referred to as a "key character string of the deadline", and the value character string corresponding to the item indicative of the deadline is referred to as a "value character string of the deadline".

Subsequently, in step S110, it is determined whether or not the value character string of the deadline is extracted. In a case where the value character string of the deadline is extracted, the process proceeds to step S112. In contrast, in a case where the value character string of the deadline is not extracted, the process proceeds to step S111. In step S111, a character string indicative of an error is output as the result of the extraction, and a routine ends.

Subsequently, in step S112, it is determined whether or not the extracted value character string of the deadline is the date format. In a case where the value character string is a character string having the pattern of the predetermined date format, the extracted value character string of the deadline is determined to be the date format. For example, in a case where the value character string is the character string of the date format, in which a 4-digit number indicative of "year" in the Christian era, a character of the "year", a 1-digit or 2-digit number indicative of "month", a character of the "month", a 1-digit or 2-digit number indicative of "day", and a character of the "day" are arranged in order of year-→month→day, the extracted value character string of the deadline is determined to be the date format. In a case of the character string of the date format, the process proceeds to step S132. In contrast, in a case of the character string other than the date format, the process proceeds to step S114.

Subsequently, in step S114, it is determined whether or not an expression pattern, which matches an expression pattern of the value character string other than the date format, exists in the deadline expression pattern list (refer to FIG. 6). In a case where the matching expression pattern exists, the process proceeds to step S116. In contrast, in a case where the matching expression pattern does not exist, the process proceeds to step S134. In step S134, the value character string other than the date format is output as the result of the extraction, and the routine ends.

Subsequently, in step S116, the calculation formula corresponding to the matching expression pattern is determined to be a calculation formula to be used based on the calculation formula table (refer to FIGS. 6 and 7).

Subsequently, in step S118, the type of the document designated by the user is acquired.

Subsequently, in step S120, the character string of the item indicative of the starting day (for example, "day of issue") corresponding to the designated type of the document is acquired as the key character string based on the starting day item list (refer to FIGS. 6 and 8).

Subsequently, in step S122, the key value extraction based on the result of the character recognition is performed using the character string of the item indicative of the starting day as the key character string, and the value character string corresponding to the key character string is extracted.

Subsequently, in step S124, it is determined whether or not the value character string of the starting day is extracted.

In a case where the value character string of the starting day is extracted, the process proceeds to step S126. In contrast, in a case where the value character string of the starting day is not extracted, the process proceeds to step S134. In step S134, the value character string other than the date format is output as the result of the extraction, and the routine ends.

Subsequently, in step S126, it is determined whether or not the value character string of the extracted starting day is the date format. In a case of the character string of the date format, the process proceeds to step S128. In step S128, the date of the starting day indicated by the character string of the date format is stored. In contrast, in a case of the character string other than the date format, the process proceeds to step S134. In step S134, the value character string other than the date format is output as the result of the extraction, and the routine ends.

Subsequently, in step S130, a character string indicative of the deadline of the date format is generated based on the calculation formula determined in step S116 and the date of the starting day stored in step S128. Subsequently, in step S132, the character string indicative of the deadline of the date format is output as the result of the extraction, and the routine ends.

Meanwhile, in a case where it is not possible to acquire the key character string in step S120, a date indicated by a character string described in a predetermined date description area (for example, an upper right field of the page) in the page may be acquired as the date of the starting day.

Second Exemplary Embodiment

In a second exemplary embodiment, a method for generating a character string indicative of a deadline of a date format is different from that of the first exemplary embodiment. In the second exemplary embodiment, a key character string of a starting day and a character string indicative of a period are acquired through morpheme analysis of a value character string of the deadline. Subsequently, the value character string according to the key character string of the starting day is acquired through key value extraction, and a date of the starting day is specified based on a value character string of the starting day. Subsequently, the character string indicative of the period is converted into the number of days. A date of the deadline is acquired based on the date of the starting day and the number of days.

Information Processing Apparatus

Figure 11:
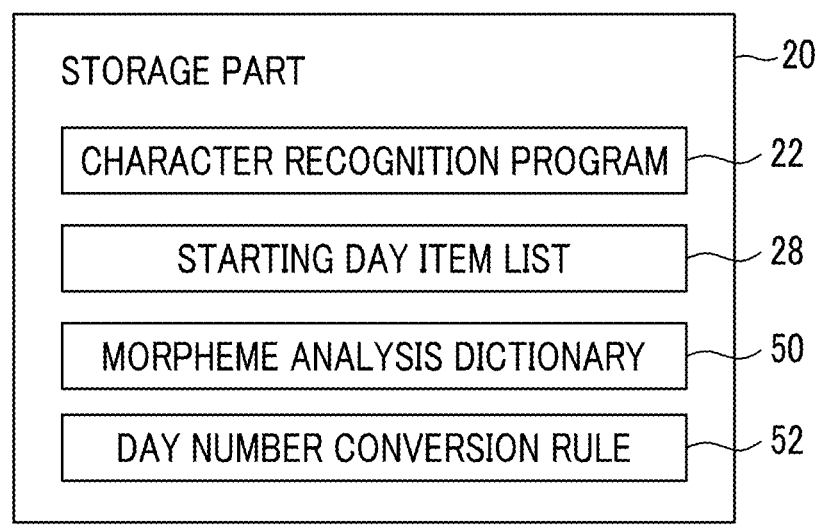
FIG. 11 is a block diagram illustrating a configuration of a storage part of an information processing apparatus according to a second exemplary embodiment.

FIG. 11 is a block diagram illustrating a configuration of a storage part of an information processing apparatus according to the second exemplary embodiment. As illustrated in FIG. 11, in the exemplary embodiment, a storage part 20 stores a character recognition program 22, a starting day item list 28, a morpheme analysis dictionary 50, and a day number conversion rule 52, which will be described later, respectively. The various programs and various data may be stored in another storage apparatus or an external storage apparatus.

Figures 15, 16:
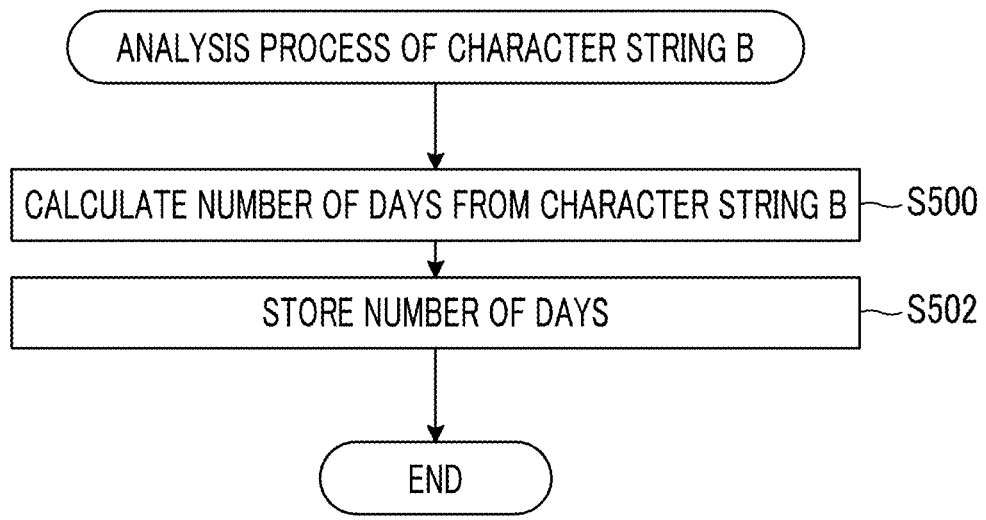
FIG. 15 is a flowchart illustrating a flow of an analysis process of a character string B.
FIG. 16 is a diagram illustrating a date conversion rule.

The morpheme analysis dictionary 50 is dictionary data which is used for the morpheme analysis. The day number conversion rule 52 is a rule for converting the character string B indicative of the period into the number of days. The day number conversion rule 52 predetermines the number of days indicated by the numeral classifier such that "month" is 30 days, "week" is 7 days, and "day" is 1 day, as illustrated in FIG. 16. For example, in a case of "3 weeks", the number of days "21 days" is calculated by multiplying 7 days by 3 based on a numeral "3" and the numeral classifier "week".

Program

Subsequently, the character recognition program will be described.

Figure 12:
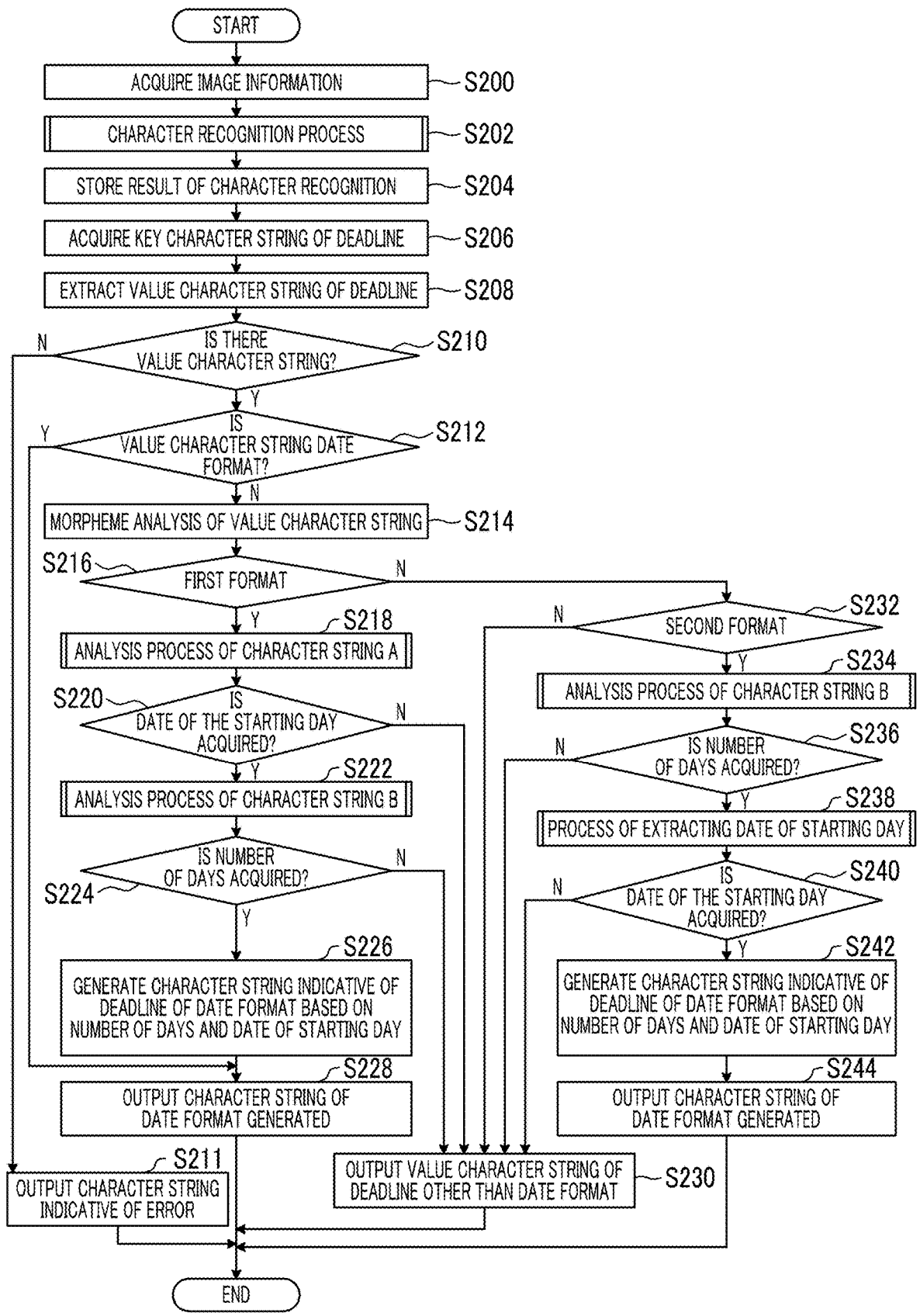
FIG. 12 is a flowchart illustrating a flow of a process by a character recognition program according to the second exemplary embodiment.

FIG. 12 is a flowchart illustrating a flow of a process by a character recognition program according to the second exemplary embodiment. The character recognition program is read from the storage part 20 and is executed by the CPU 12A of the information processing apparatus 10. In a case where it is instructed to start the character recognition process by the user, the character recognition program is executed.

First, in step S200, the image information of the read image of the estimation sheet is acquired from the image reading part 16. Subsequently, in step S202, the character recognition process is performed with respect to the read image of the estimation sheet. Subsequently, instep S204, a result of character recognition is stored. Subsequently, in step S206, the character string of the item indicative of the deadline designated by the user is acquired as the key character string.

Subsequently, in step S208, the key value extraction based on the result of the character recognition is performed using the character string of the item indicative of the deadline as the key character string, and the value character string corresponding to the key character string is extracted. Subsequently, in step S210, it is determined whether or not the value character string of the deadline is extracted. In a case where the value character string of the deadline is extracted, the process proceeds to step S212. In contrast, in a case where the value character string of the deadline is not extracted, the process proceeds to step S211. In step S211, the character string indicative of the error is output as the result of the extraction, and the routine ends.

Subsequently, in step S212, it is determined whether or not the value character string of the extracted deadline is the date format. In a case of the character string of the date format, the process proceeds to step S228. In contrast, in a case of the character string other than the date format, the process proceeds to step S214.

Subsequently, in step S214, the morpheme analysis of the value character string of the extracted deadline is performed. As described above, the extracted value character string of the deadline is separated into the morpheme units using the morpheme analysis dictionary 50, and the respective morphemes are determined and given as the part of speech, the utilization, the reading, and the like.

Subsequently, in step S216, it is determined whether or not the format of the value character string of the deadline corresponds to the first format. In a case where the format of the value character string of the deadline corresponds to the first format, the process proceeds to step S218. In contrast, in a case where the format of the value character string of the deadline does not correspond to the first format, the process proceeds to step S232.

Subsequently, in step S218, an analysis process of the character string A is performed.

Analysis Process of Character String A

Figure 13:
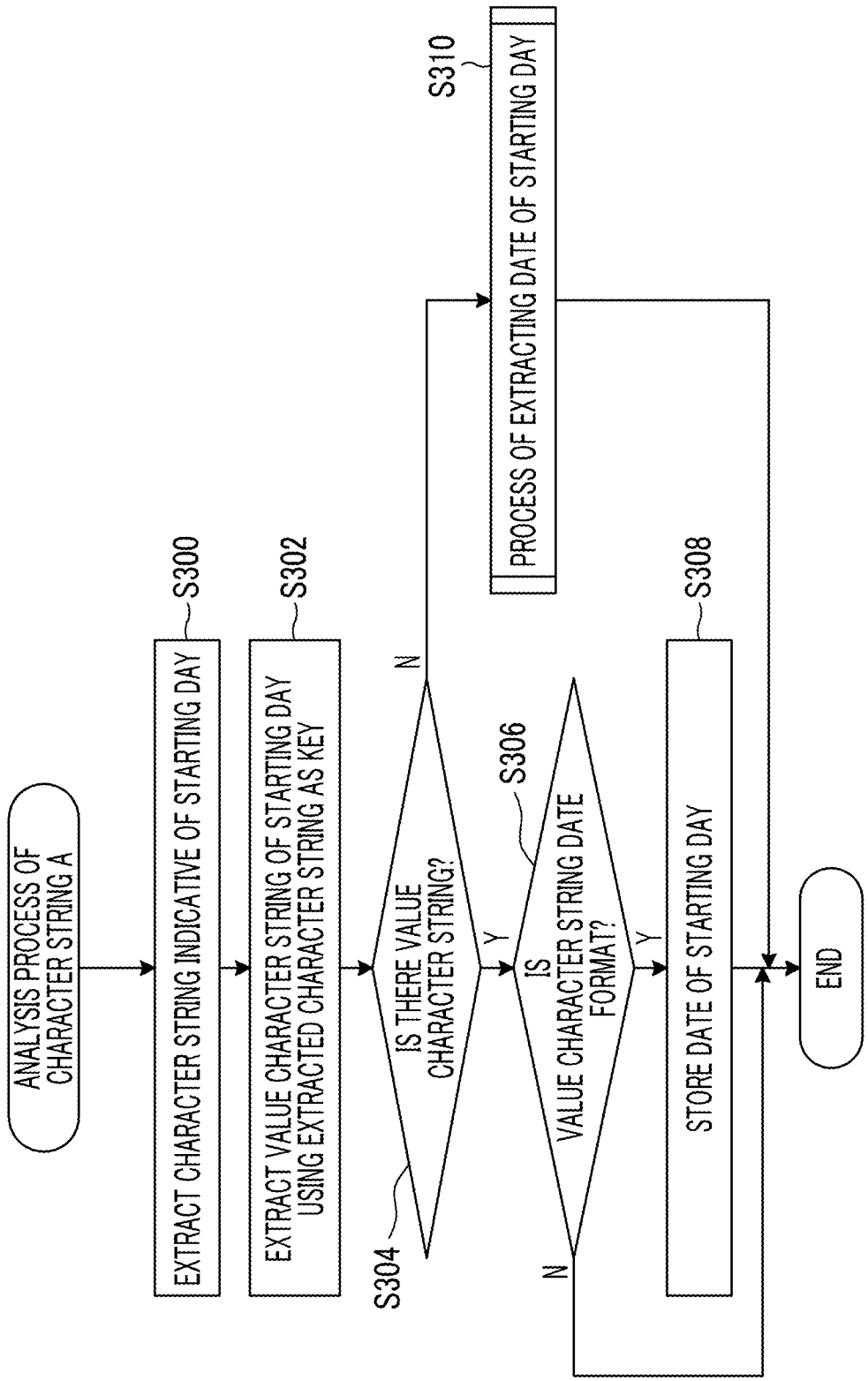
FIG. 13 is a flowchart illustrating a flow of an analysis process of a character string A.

Here, the "analysis process of the character string A" will be described. FIG. 13 is a flowchart illustrating a flow of the analysis process of the character string A. In the analysis process of the character string A, first, in step S300, a character string indicative of the starting day is extracted from the character string A.

Subsequently, in step S302, the key value extraction based on the result of the character recognition is performed using the character string of the item indicative of the starting day as the key character string, and thus the value character string corresponding to the key character string is extracted.

Figure 14:
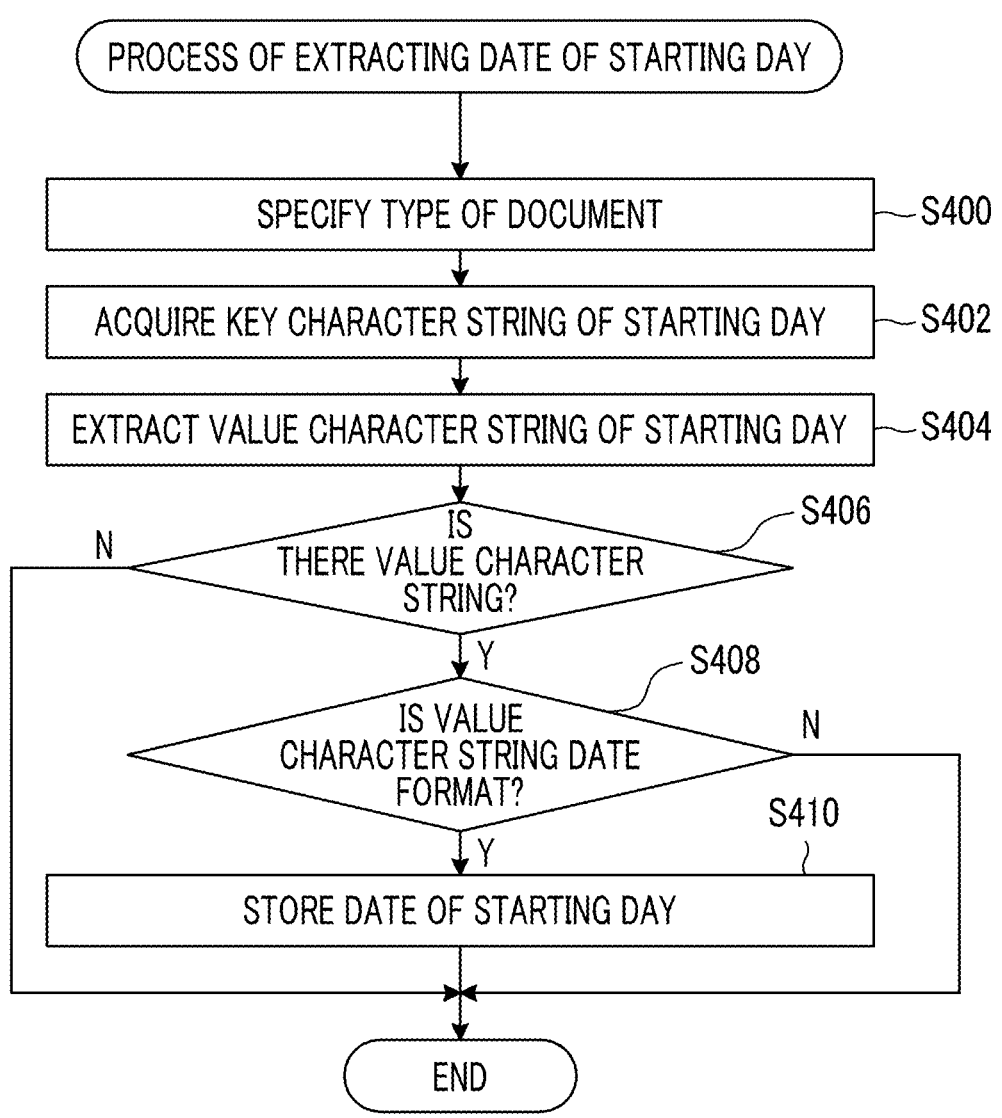
FIG. 14 is a flowchart illustrating a flow of a date extraction process of a starting day.

Subsequently, in step S304, it is determined whether or not the value character string of the starting day is extracted. In a case where the value character string of the starting day is extracted, the process proceeds to step S306. In contrast, in a case where the value character string of the starting day is not extracted, the process proceeds to step S310. In step S310, a "process of extracting the date of the starting day" illustrated in FIG. 14 is performed, and the routine ends.

Subsequently, in step S306, it is determined whether or not the extracted value character string of the starting day is the date format. In a case of the character string of the date format, the process proceeds to step S308. In step S308, the date of the starting day, which is indicated by the character string of the date format, is stored, and the routine ends. In contrast, in a case of the character string other than the date format, the routine ends.

Meanwhile, in step S300, in a case where it is not possible to acquire the key character string, a date, which is indicated by the character string described in a predetermined date description area in a page, may be acquired as the date of the starting day.

Process of Extracting Date of Starting Day

Here, the "process of extracting the date of the starting day" will be described.

FIG. 14 is a flowchart illustrating a flow of the process of extracting the date of the starting day. In the process of extracting the date of the starting day, first, in step S400, the type of the document designated by the user is acquired.

Subsequently, in step S402, the character string of the item indicative of the starting day (for example, "day of issue") corresponding to the designated type of the document is acquired, using the starting day item list (refer to FIGS. 6 and 8), as the key character string.

Subsequently, in step S404, the key value extraction based on the result of the character recognition is performed using the character string of the item indicative of the starting day as the key character string, and the value character string corresponding to the key character string is extracted.

Subsequently, in step S406, it is determined whether or not the value character string of the starting day is extracted. In a case where the value character string of the starting day is extracted, the process proceeds to step S408. In contrast, in a case where the value character string of the starting day is not extracted, the routine ends.

Subsequently, in step S408, it is determined whether or not the extracted value character string of the starting day is the date format. In a case of the character string of the date format, the process proceeds to step S410. In step S410, the date of the starting day, which is indicated by the character string of the date format, is stored. In contrast, in a case of the character string other than the date format, the routine ends.

Meanwhile, in a case where it is not possible to acquire the key character string in step S402, the date, which is indicated by the character string described in the predetermined date description area in the page, may be acquired as the date of the starting day.

Returning to description with reference to FIG. 12.

Subsequently, in step S220, it is determined whether or not it is possible to acquire the date of the starting day as a result of the analysis process of the character string A. In a case where it is possible to acquire the date of the starting day, the process proceeds to step S222. In a case where it is not possible to acquire the date of the starting day, the process proceeds to step S230. In step S230, the value character string other than the date format is output as the result of the extraction, and the routine ends.

Subsequently, in step S222, an analysis process of the character string B is performed.

Analysis Process of Character String B

Here, the "analysis process of the character string B" will be described.

FIG. 15 is a flowchart illustrating a flow of the analysis process of the character string B. In the analysis process of the character string B, first, in step S500, the character string B indicative of the period is converted into the number of days using the day number conversion rule. Subsequently, in step S502, the calculated number of days is stored, and the routine ends.

Returning to description with reference to FIG. 12.

Subsequently, in step S224, it is determined whether or not it is possible to acquire the number of days as a result of the analysis process of the character string B. In a case where it is possible to acquire the number of days, the process proceeds to step S226. In a case where it is not possible to acquire the number of days, the process proceeds to step S230. In step S230, the value character string other than the date format is output as the result of the extraction, and the routine ends.

Subsequently, in step S226, the character string indicative of the deadline of the date format is generated based on the date of the starting day acquired in step S218 and the number of days acquired in step S222. Subsequently, in step S228, the character string indicative of the deadline of the date format is output as the result of the extraction, and the routine ends.

In addition, in a case where the format of the value character string of the deadline does not correspond to the first format and the process proceeds to step S232 in step S216, it is subsequently determined whether or not the format of the value character string of the deadline corresponds to the second format in step S232. In a case where the format of the value character string of the deadline corresponds to the second format, the process proceeds to step S234. In contrast, in a case where the format of the value character string of the deadline does not correspond to the second format, the process proceeds to step S234.

Subsequently, in step S234, the analysis process of the character string B illustrated in FIG. 15 is performed.

Returning to description with reference to FIG. 12.

Subsequently, in step S236, it is determined whether or not it is possible to acquire the number of days as a result of the analysis process of the character string B. In a case where it is possible to acquire the number of days, the process proceeds to step S238. In a case where it is not possible to acquire the number of days the number of days, the process proceeds to step S230. In step S230, the value character string other than the date format is output as the result of the extraction, and the routine ends.

In step S238, the "process of extracting the date of the starting day" illustrated in FIG. 14 is performed.

Subsequently, in step S240, it is determined whether or not it is possible to acquire the date of the starting day as a result of the process of extracting the date of the starting day. In a case where it is possible to acquire the date of the starting day, the process proceeds to step S242. In a case where it is not possible to acquire the date of the starting day, the process proceeds to step S230. In step S230, the value character string other than the date format is output as the result of the extraction, and the routine ends.

Subsequently, in step S242, the character string indicative of the deadline of the date format is generated based on the number of days acquired in step S234 and the date of the starting day acquired in step S238. Subsequently, in step S244, the character string indicative of the deadline of the date format is output as the result of the extraction, and the routine ends.

MODIFIED EXAMPLE

Meanwhile, the configurations of the information processing apparatus and the program described in the exemplary embodiment are examples, and it is apparent that the configurations maybe changed in a scope which does not depart from the gist of the present invention.

In each of the exemplary embodiments, an example, in which the program is executed using the computer and each of the processes is realized through a software configuration, is described. However, the present invention is not limited thereto. For example, each of the processes may be realized through a hardware configuration or a combination of the software configuration and the hardware configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
  a first extraction part that extracts a value corresponding to a first item, which is an item indicative of a deadline, from a result of character recognition with respect to an image acquired by reading a document which includes an item and a value corresponding to the item;
  a generation part that generates a second character string of a date format indicative of a date of the deadline based on the result of the character recognition in a case where the value extracted by the first extraction part is a first character string other than the date format; and
  an output part that outputs the generated second character string as the value corresponding to the first item.

2. The information processing apparatus according to claim 1,
  wherein the generation part includes
    an acquisition part that acquires a second item which is different from the first item, and
    a second extraction part that extracts a value corresponding to the second item from the result of the character recognition, and
  generates the second character string of the date format based on the extracted value corresponding to the acquired second item.

3. The information processing apparatus according to claim 2,
  wherein the second item is an item indicative of a starting day which is a reference for calculating the deadline, and
  wherein the generation part acquires a date indicated by a third character string as a date of the starting day in a case where the value extracted by the second extraction part is the third character string of the date format.

4. The information processing apparatus according to claim 3,
wherein the generation part acquires a date indicated by a fifth character string described in a predetermined date description area of the image as the date of the starting day in a case where the value extracted by the second extraction part is a fourth character string other than the date format.

5. The information processing apparatus according to claim 4,
wherein the acquisition part acquires the item indicative of the starting day according to a designated type of the document from an item storage part that previously stores the item indicative of the starting day according to each of types of a plurality of documents.

6. The information processing apparatus according to claim 5,
wherein the generation part acquires the date of the deadline corresponding to the acquired date of the starting day using a calculation formula for calculating the date of the deadline based on the date of the starting day, and generates the second character string of the date format.

7. The information processing apparatus according to claim 4,
wherein the acquisition part acquires the item indicative of the starting day through morpheme analysis of the first character string.

8. The information processing apparatus according to claim 7,
wherein the generation part acquires the date of the deadline corresponding to the acquired date of the starting day using a calculation formula for calculating the date of the deadline based on the date of the starting day, and generates the second character string of the date format.

9. The information processing apparatus according to claim 4,
wherein the generation part acquires the date of the deadline corresponding to the acquired date of the starting day using a calculation formula for calculating the date of the deadline based on the date of the starting day, and generates the second character string of the date format.

10. The information processing apparatus according to claim 9,
wherein the calculation formula for calculating the date of the deadline is acquired according to an expression pattern of the first character string from a calculation formula storage part that previously stores the calculation formula according to each of a plurality of expression patterns other than the date format.

11. The information processing apparatus according to claim 3,
wherein the acquisition part acquires the item indicative of the starting day according to a designated type of the document from an item storage part that previously stores the item indicative of the starting day according to each of types of a plurality of documents.

12. The information processing apparatus according to claim 11,
wherein the generation part acquires the date of the deadline corresponding to the acquired date of the starting day using a calculation formula for calculating the date of the deadline based on the date of the starting day, and generates the second character string of the date format.

13. The information processing apparatus according to claim 3,
wherein the acquisition part acquires the item indicative of the starting day through morpheme analysis of the first character string.

14. The information processing apparatus according to claim 13,
wherein the generation part acquires the date of the deadline corresponding to the acquired date of the starting day using a calculation formula for calculating the date of the deadline based on the date of the starting day, and generates the second character string of the date format.

15. The information processing apparatus according to claim 3,
wherein the generation part acquires the date of the deadline corresponding to the acquired date of the starting day using a calculation formula for calculating the date of the deadline based on the date of the starting day, and generates the second character string of the date format.

16. The information processing apparatus according to claim 15,
wherein the calculation formula for calculating the date of the deadline is acquired according to an expression pattern of the first character string from a calculation formula storage part that previously stores the calculation formula according to each of a plurality of expression patterns other than the date format.

17. The information processing apparatus according to claim 3,
wherein the generation part generates the second character string of the date format by acquiring a period from the starting day to the deadline through morpheme analysis of the first character string, converting the acquired period into the number of days, and acquiring the number of days and the date of the deadline corresponding to the date of the starting day.

18. The information processing apparatus according to claim 1,
wherein the output part displays the second character string of the date format on a display part.

19. The information processing apparatus according to claim 18,
wherein the output part replaces the first character string other than the date format, which is included in the result of the character recognition, with the second character string of the date format.

20. A non-transitory computer readable medium storing a program causing a computer to function as each part of the information processing apparatus according to claim 1.

* * * * *